US008917979B2

(12) United States Patent
Chang et al.

(10) Patent No.: US 8,917,979 B2
(45) Date of Patent: Dec. 23, 2014

(54) SCENE SWITCHING SYSTEM AND METHOD APPLICABLE TO A PLURALITY OF MEDIA CHANNELS AND RECORDING MEDIUM THEREOF

(71) Applicant: Institute for Information Industry, Taipei (TW)

(72) Inventors: Chia-Hsiang Chang, Taipei (TW); Kun-Hung Lee, Taipei (TW); Yueh-Ying Chang, Taipei (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 13/708,579

(22) Filed: Dec. 7, 2012

(65) Prior Publication Data

US 2014/0133828 A1     May 15, 2014

(30) Foreign Application Priority Data

Nov. 9, 2012    (TW) .............................. 101141830 A (51) Int. Cl.
| H04N 5/783 | (2006.01) |
| H04N 5/76 | (2006.01) |
| H04N 5/91 | (2006.01) |
| H04N 9/82 | (2006.01) |

(52) U.S. Cl.
CPC . *H04N 5/91* (2013.01); *H04N 5/76* (2013.01); *H04N 9/8205* (2013.01)
USPC .......................................... 386/350; 386/343

(58) Field of Classification Search
None
See application file for complete search history.

(56) References Cited

U.S. PATENT DOCUMENTS

| 8,045,841 | B2 * | 10/2011 | Ahn ............................... 386/291 |
| 2007/0047905 | A1 * | 3/2007 | Ahn ................................. 386/83 |
| 2007/0250771 | A1 * | 10/2007 | Lee et al. ....................... 715/703 |
| 2013/0014137 | A1 * | 1/2013 | Bhatia et al. ...................... 725/9 |

FOREIGN PATENT DOCUMENTS

| KR | 10-2006-0095794 A | 9/2006 |
| KR | 2007-0106136 A | 11/2007 |

* cited by examiner

*Primary Examiner* — William C Vaughn, Jr.
*Assistant Examiner* — Eileen Adams
(74) *Attorney, Agent, or Firm* — Muncy, Geissler, Olds & Lowe, P.C.

(57) ABSTRACT

A scene switching system and method applicable to a plurality of media channels and a recording medium thereof are provided, which are used for switching and playing scenes for a plurality of media channels. Such a system includes a channel connection module and a media switching module. The channel connection module acquires first media data and second media data from a first media channel and a second media channel. The media switching module, when determining that a first switching setting corresponding to the first media data is set to be activated and the second media data is being played, analyzes whether a first playing scene of the first media data agrees with scene demand data of the first switching setting, and decides whether to perform switching processing on the first playing scene according to the first switching setting.

20 Claims, 7 Drawing Sheets

SCENE SWITCHING SYSTEM AND METHOD APPLICABLE TO A PLURALITY OF MEDIA CHANNELS AND RECORDING MEDIUM THEREOF

CROSS-REFERENCE TO RELATED APPLICATION

This application claims the benefit of Taiwan Patent Application No. 101141830, filed on Nov. 9, 2012, which is hereby incorporated by reference for all purposes as if fully set forth herein.

BACKGROUND OF THE INVENTION

1. Field of Invention

The present invention relates to a system and method for switching and playing media and a recording medium thereof, and more particularly to a scene switching system and method for switching and playing scenes in an environment of a plurality of media channels and a recording medium thereof.

2. Related Art

In the prior art, when supplying a media program and broadcasting videos and audios, a television station or a channel provider usually broadcasts media continuously at the channel of a program according to the time recorded in a program schedule. A user needs to watch a program according to the broadcasting time of the program. When more than two channels broadcast programs that a user want to watch at the same time, when there is only one television, the user needs to choose a channel to watch a demanded program or keep switching the connected channels of the television with a controller. Alternatively, a user may form a media file by recording and storing the data of media programs broadcasted by relevant channels using a media recording device, and then play the media file by using a playing device or playing software.

SUMMARY OF THE INVENTION

The objective of the present invention is to provide a scene switching system and method and a recording medium thereof that perform conditioned scene switching analysis during switching of media channels.

To achieve the above system objective, the present invention discloses a scene switching system applicable to a plurality of media channels, which comprises a channel connection module and a media switching module. The channel connection module is used for acquiring first media data through a first media channel, and acquiring second media data through a second media channel. The media switching module, when playing the second media data, analyzes whether a first playing scene of the first media data agrees with scene demand data of a first switching setting, and decides whether to perform switching processing on the first playing scene according to the first switching setting.

To achieve the above method objective, the present invention discloses a scene switching method applicable to a plurality of media channels, which comprises: acquiring first media data from a first media channel and acquiring second media data from a second media channel with a channel connection module; and when determining that a switching setting corresponding to the first media data is set to be activated and the second media data is being played, analyzing, by a media switching module, whether a first playing scene of the first media data agrees with scene demand data of the switching setting; and deciding, by the media switching module, according to an analysis result, whether to perform switching processing on the first playing scene according to the switching setting.

The present invention also discloses a recording medium which stores a program code readable by an electronic device. When reading the program code, an electronic device executes a scene switching method applicable to a plurality of media channels. The method has been described above.

In the scene switching system and method and the recording medium thereof disclosed in the present invention, when the media of other channels is being watched, analysis and switching processing for example, the storage of scene segments and setting of playing timepoints, is performed on the media transmitted in a specific channel. Analysis and switching processing may also be performed on the media transmitted in an original channel during channel switching. When the system is switched back to the specific channel or the channel before switching, a user may watch user demanded scene segments of the user after switching analysis and processing. That is to say, a user may watch demanded scene segments relatively insusceptible to a playing time. Next, as disclosed in the present invention, a user inputs scene switching information to perform targeted processing on demanded segments, which are capable of reducing the operational troubles for a user to manipulate media data to seek scene segments.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The preferred embodiments of the present invention are illustrated below in detail with reference to the accompanying drawings.

Figure 1:
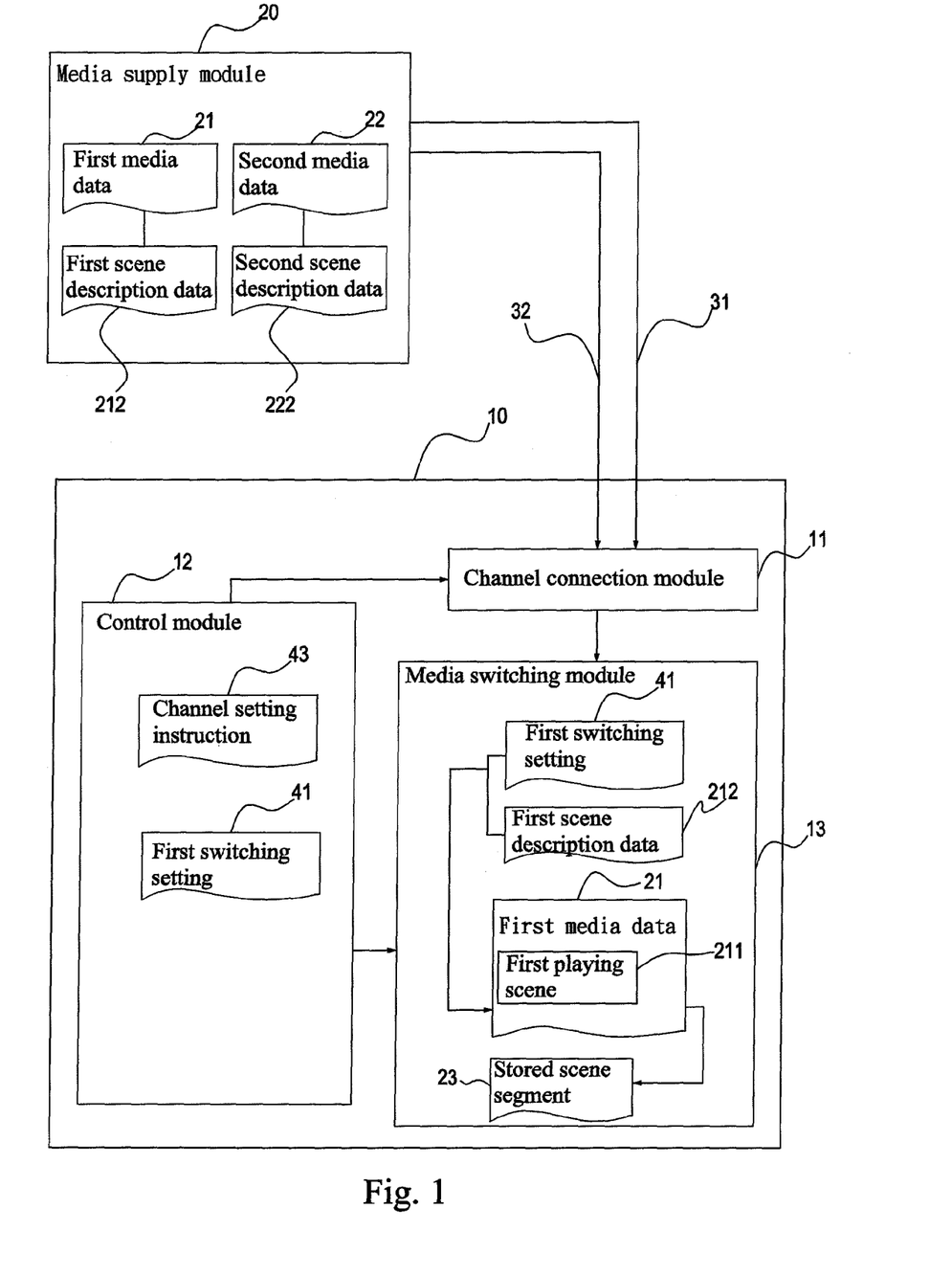
FIG. 1 is a schematic view of a system and switching analysis of first media data according to an embodiment of the present invention.

FIG. 1 is a schematic view of a system and switching analysis of first media data according to an embodiment of the present invention. The scene switching system includes a channel connection module 11 and a media switching module 13. The scene switching system 10 may be built in any electronic device capable of receiving television media or network media. The electronic device has the capability of playing this type of media or outputting the media to other display devices for playing, and for example, includes, but is not limited to, a set-top box, a digital television device, an Internet Protocol Television (IPTV) device, where all electronic devices having the same or similar functions are suitable. The system is connected to media supply equipment of a media provider. Here, in the example, media supply equipment is connected to a system through a network.

The channel connection module 11 is used for connecting a media channel to acquire media data supplied by the media supply equipment through the media channel. The media channel is a cable TV channel or a wireless TV channel, or that IPTV equipment utilizes IP addresses or media play groups. Such an IPTV structure is a broadcast structure or a multicast structure.

The media data includes multiple scene segments of different contents. For example, when the media data is image data, the image data means image frames having more than one of contents such as targets, scenes, and characters. In another example, when the media data is voice data, the voice data means voice frames having more than one of contents such as high pitches, low pitches, speeches and music.

The media switching module 13 is software or hardware or is formed of software and hardware, for example, application soft executed by an operation processor, a chip, an integrated circuit (IC), or further firmware that operates by combining a chip or IC, which is not limited here and depends on the demands of designers.

The media switching module 13 acquires the media data transmitted from the media channel and plays the media data. The media transmitted in the media channel is media supplied by a media supply module 20 of a media provider. The media supply module 20 is hardware or a combination of at least one of the forms such as a unit, component, device, equipment, and system combining software and hardware that has the capability of supplying media. The media channel is a wired/wireless TV channel, a network address of IPTV equipment or a media play group generated by IPTV equipment.

However, when the media switching module 13 determines that a switching setting is activated, which corresponds to a channel other than the current channel, the media switching module 13 analyzes the media data transmitted on the channel corresponding to the switching setting to determine whether to perform switching processing.

For example, the channel connection module 11 is connected to the first media channel 31 to acquire first media data 21 from the first media channel 31, and connected to the second media channel 32 to acquire second media data 22 from the second media channel 32. When the media switching module 13 determines that a first switching setting 41 corresponding to the first media channel 31 is activated, the media switching module 13 continuously analyzes the first media data 21 acquired from the first media channel 31 during the playing of the second media data 22 to determine whether a first playing scene 211 of the first media data 21 at a current timepoint agrees with the scene demand data recorded by the first switching setting 41, and decide whether to perform switching processing on the first playing scene 211 according to the first switching setting 41. According to different scene demand data, the media switching module 13 also analyzes the first playing scene 41 in a different manner. The illustration is as follows:

(1) The first switching setting 41 records the playing content of a demanded scene. The media switching module 13 analyzes the playing content of the first playing scene 41 and determines whether it agrees with the playing content recorded in the first switching setting 41.

(2) The first switching setting 41 records the playing timepoint of a demanded scene. The media switching module 13 analyzes the current time and determines whether the current time agrees with the playing timepoint recorded in the first switching setting 41.

Moreover, the first switching setting 41 also records auxiliary instruction data of a demanded scene, such as a segment title, text language, audio language, segment level, segment source, copyright holder, which is used as an analysis condition for media switching module 13, but is not limited thereto.

However, the media switching module 13 may obtain the playing content, playing time and auxiliary instruction data of the first playing scene 211 through first scene description data 212 corresponding to the first media data 21. It should be noted that the first scene description information 212 is denotation data for denoting the first media data 21 or further the media frames and scene segments included therein, for example, the indication data such as the brief description of playing content, playing time, and title of the first media data 21. The first scene description data 212 is supplied to the scene switching system 10 by the media supply module 20. Alternatively, a third-party scene server module (not shown) acquires the first media data 21, generates the first scene description data 212, and then supplies the first scene description data 212 to the scene switching system 10. Also, the media supply module 13 (or the scene server module) may also supply the playing time code of each first playing scene 212 corresponding to the first media data 21, so the media switching module 13 analyzes the playing timepoint of each first playing scene 212.

In addition, the first switching setting 41 may be configured in at least the following manners:

(1) The first switching setting 41 is a preset value of a system.

(2) The media supply module 13 (or scene server module) supplies the first switching setting 41 to the scene switching system 10 for use by the media switching module 13. That is, the first switching setting 41 is supplied by a media provider or relevant assistant units. A user may supply the demands thereof to a provider through any manner of interaction with a provider, such as, e-mail, telephone, video call, text registration, mails, and conversation with service personnel at the counter.

(3) A control module 12 inputs or sets the first switching setting 41. The control module 12 may be disposed together with other modules in one same electronic device to form an operation interface or may be designed into a controller capable of being held by a user.

Figure 2:
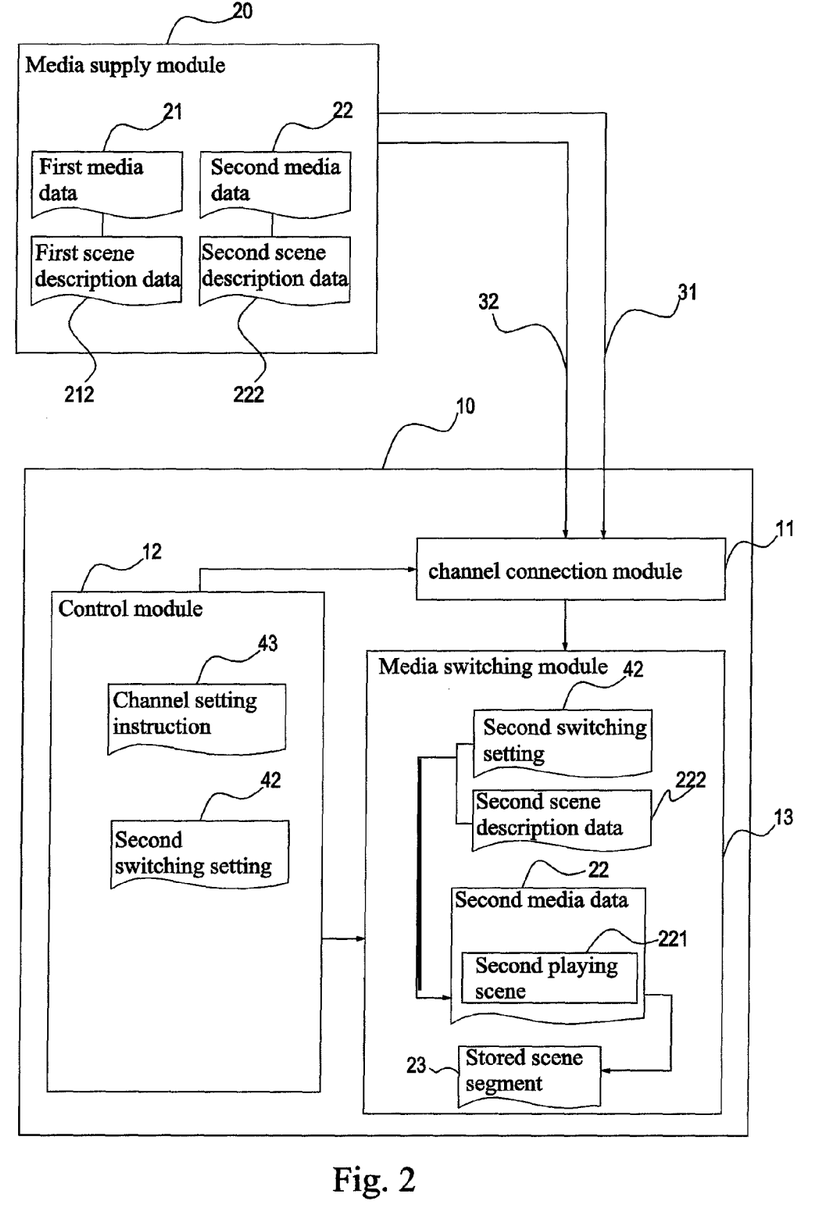
FIG. 2 is a schematic view of a system and switching analysis of second media data according to an embodiment of the present invention.

A user may set the activation and deactivation of the first switching setting 41 (or other similar switching settings, for example, the second switching setting 42 corresponding to the second media data 22 in FIG. 2) with the control module 12. The media switching module 13 is set to deactivate the first switching setting 41, so as to stop the switching processing of the first media data 21. Also, it may also be designed that the control module 12 is capable of outputting a channel setting instruction 43. A user may instruct a system to connect a media channel that shall be connected by using the control module 12, and enable the media switching module 13 to play the media data acquired from the connected media channel.

When analyzing that the first playing scene 211 agrees with the scene demand data of the first switching setting 41, the media switching module 13 performs switching processing on the first playing scene 211. The processing manner at least includes the following:

(1) The media switching module 13 records the first playing scene 211 as a stored scene segment 23. When the media switching module 13 is set to play the first media data 21 instead of the second media data 22, any one of the following actions is performed: (a) playing the stored scene segment 23 automatically; (b) sending prompt information, for example, a prompt picture or text to the picture of a related display (not shown) for reference by a user, and deciding whether to play the stored scene segment 23 according to the choice of the user; and (c) when the media switching module 13 is set to play the first media data 21, according to the state of the first switching setting 41, for example, whether the first switching setting 41 is activated or deactivated or other states capable of being set, deciding whether to play the stored scene segment 23.

Alternatively, when the media switching module 13 finishes the storage work of the stored scene segment 23, any one of the following actions is performed: (a) automatically setting to connect the first media channel 31 to play the stored scene segment 23; and (b) sending prompt information to inform a user that the storage work of the stored scene segment 23 is finished.

(2) The media switching module 13 records the playing timepoint of the first playing scene 211. When the media switching module 13 is set to the play first media data instead of the second media data, any one of the following actions is performed: (a) automatically requiring the media supply module 20 to transmit the first playing scene 211 of the first media data 21 again from the playing timepoint; (b) sending prompt information, for example, a prompt picture or text to the picture of a related display (not shown) for reference by a user, and deciding whether to supply the playing timepoint to the media supply module 20 according to the choice input by the user; and (c) when the media switching module 13 is set to play the first media data 21, according to the state of the first switching setting 41, deciding whether to supply the playing timepoint to the media supply module 20.

Alternatively, when the media switching module 13 determines that the playing timepoint finishes to be stored, or determines that the playing timepoint of the first playing scene 211 is reached, any one of the following actions is performed: (a) automatically setting to connect the first media channel 31 and requiring the media supply module 20 to transmit the first playing scene 211 of the first media data 21 from the playing timepoint; and (b) sending prompt information to inform a user that the playing timepoint is reached and query whether to switch to play the first playing scene 211.

In addition, when the media switching module 13 is set to play the first media data 21 (or the media data transmitted by other media channels), the media switching module 13 determines whether the current scene of the second media data 22 has already been played, that is, whether the scene being played reaches an end or whether the scene segment has been completely played. If it is not finished yet, the media switching module 13 waits till the current scene of the second media data 22 has been played to switch to play the first media data 21. However, upon acquiring a direct switching and playing instruction, the media switching module 13 does not determine whether the current scene of the second media data 22 is finished, and instead directly plays the first media data 21 transmitted from the first media channel 31.

However, when playing the first media data 21 instead of the second media data 22, the media switching module 13 records a return point to correspond to the current scene of the second media data 22. When being set to play the second media data 22 instead of the first media data 21 again, the media switching module plays the second media data 22 from the return point. However, when acquiring a direct playing instruction, the media switching module plays the scene corresponding to the current time of the second media data 22.

FIG. 2 is a schematic view of a system and switching analysis of second media data according to an embodiment of the present invention. Referring to FIG. 2, when the media switching module 13 is playing the first media data 21 through the media transmission of the first media channel 31 (however, it is not limited thereto, when there are more than three media channels, the media data transmitted by other media channels may also be played), upon determining that a second switching setting 42 corresponding to the second media data 22 is activated, the media switching module 13 analyzes whether a second playing scene 221 of the second media data 22 agrees with the scene demand data of the second switching setting 42, so as to decide whether to perform switching processing on the second playing scene 221 according to the second switching setting 42. The mode or method that the media switching module 13 may perform switching analysis on the second media data 22 in combination with the second scene description data 222 corresponding to the second media data 22 or the playing time code is the same as switching analysis on the first media data 21 by the media switching module 13, which is no longer described here.

Figure 3:
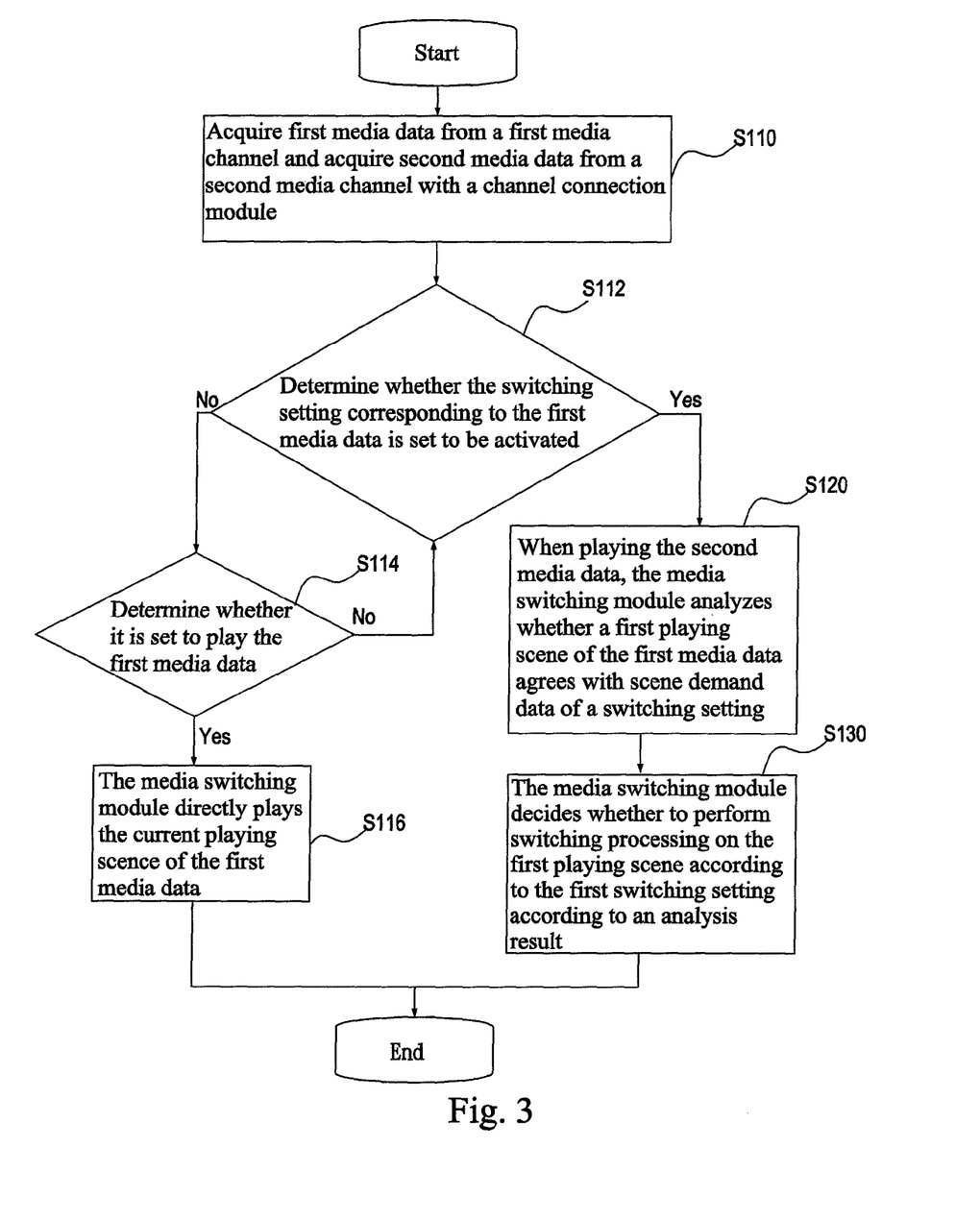
FIG. 3 is a flow chart of a scene switching method according to an embodiment of the present invention.
Figure 4:
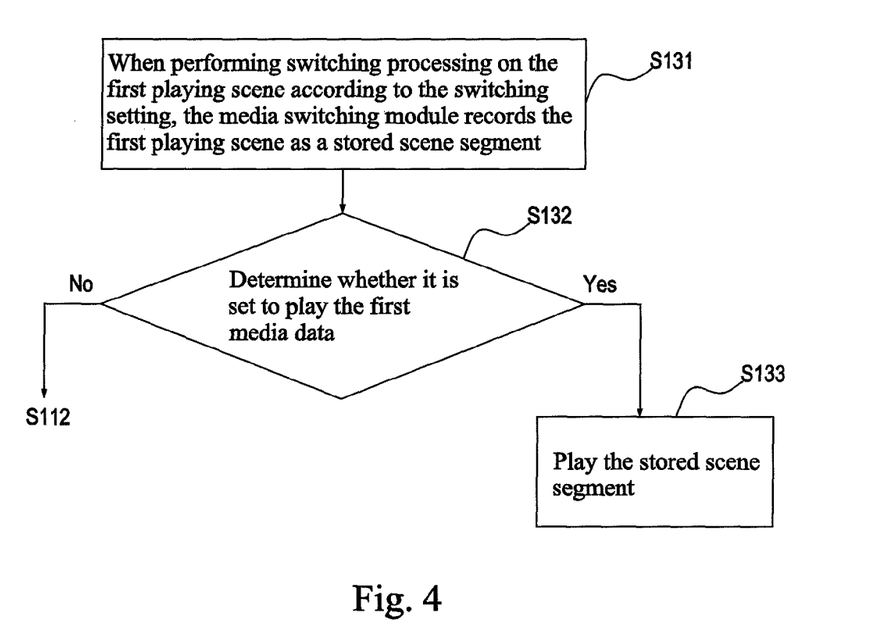
FIG. 4 and FIG. 5 are detailed flow charts of a scene switching method according to an embodiment of the present invention.
Figure 5:
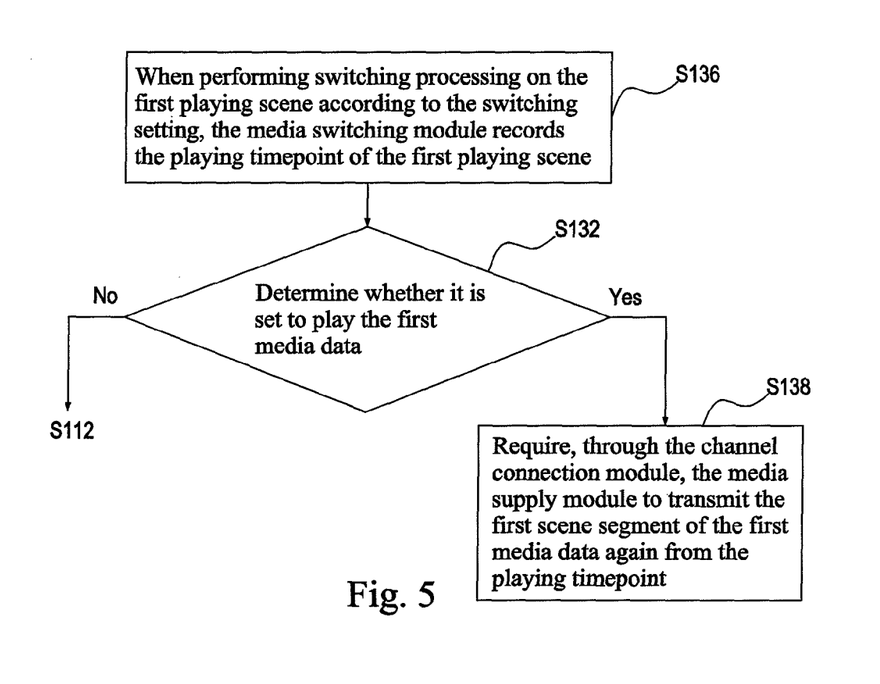
Figure 6:
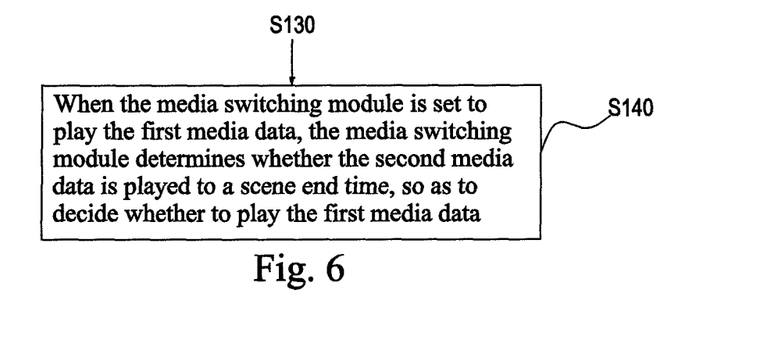
FIG. 6 and FIG. 7 are extended flow charts of a scene switching method according to an embodiment of the present invention.
Figure 7:
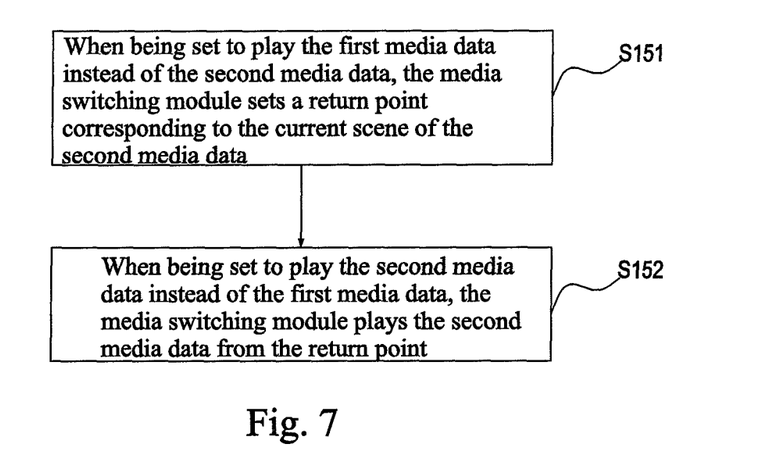

FIG. 3 is a flow chart of a scene switching method according to an embodiment of the present invention. FIG. 4 and FIG. 5 are detailed flow charts of a scene switching method according to an embodiment of the present invention. FIG. 6 and FIG. 7 are extended flow charts of a scene switching method according to an embodiment of the present invention. Referring to FIG. 3 to FIG. 7, in this example, the media supply module 20 supplies different media to the system through a first media channel 31 and a second media channel 32; however, the present invention is not limited thereto. Here, switching between two media channels is taken as an example, and the process is as follows:

Acquire first media data 21 from a first media channel 31 and acquire second media data 22 from a second media channel 32 with a channel connection module 11 (Step S110). The media data transmitted in the media channel is supplied by a media supply module 20 of a media provider.

When playing the second media data 22, the media switching module 13 analyzes whether a first playing scene 211 of the first media data 21 agrees with scene demand data of a switching setting (Step S120).

During the playing of the second media data 22, the media switching module 13 determines whether the first playing scene 211 of the first media data 21 agrees with the scene demand data recorded in the first switching setting 41 at a current timepoint, so as to decide whether to perform switching processing on the first playing scene 211 according to the first switching setting 41. The media switching module 13 analyzes the first playing scene 211 according to the playing content, playing timepoint, and auxiliary instruction data of the demanded scene recorded in the first switching setting 41. The media switching module 13 also analyzes the first media data 21 through the first scene description data 212.

However, before analyzing the first playing scene, the media switching module 13 determines whether the switching setting corresponding to the first media data 21 is set to be activated (Step S112). In this example, it means the media switching module 13 first determines whether a first switching setting 41 is set to be activated. When the first switching setting 41 is set to be activated, no matter it is preset to be activated or it is set to be activated by a user with a control module, the media switching module 13 performs Step S120.

Otherwise, when the media switching module 13 determines that the first switching setting 41 is set to be deactivated, no matter it is preset to be deactivated or it is set to be deactivated by a user with a control module, the media switching module 13 does not analyze the playing content of the first media data 21, and determines whether it is set to play the first media data 21 (Step S114). If the media switching module 13 determines that it is set to play the first media data 21, as the switching setting of the first media data 21 is not activated, the media switching module directly plays the current playing scene of the first media data 21 (Step S116). Otherwise, the media switching module returns to Step S112 and continuously determines whether the switching setting corresponding to the first media data 21 is changed.

Next, the media switching module 13 decides, according to an analysis result, whether to perform switching processing on the first playing scene 211 according to the first switching setting 41 (Step S130). Here, the first playing scene 211 means the current playing scene of the first media data 21. When analyzing that the first playing scene 211 does not meet the demand of the first switching setting 41, the media switching module 13 does not perform switching processing on the first playing scene 211. The media switching module 13 waits for the playing of a next first playing scene and analyzes the next first playing scene, until the media switching module 13 is set to play the first media data 21, or is set to deactivate the first switching setting 41.

When the media switching module 13 decides to perform switching processing on the first playing scene 211, there are at least the following processing manners:

(A) When performing switching processing on the first playing scene 211 according to the switching setting, the media switching module 13 records the first playing scene 211 as a stored scene segment 23 (Step S131).

However, during the playing of the second media data 22, the media switching module 13 determines whether it is set to play the first media data 21 (Step S132). When the media switching module 13 is set to play the first media data 21, the media switching module 13 plays the stored scene segment 23 (Step S133). When being not set to play the first media data 21, the media switching module 13 returns to Step S112 to confirm whether the first switching setting 41 corresponding to the first media data 21 is changed.

Here, Step S112 and Step S132 are further illustrated. When a user watches the second media data 22 of the second media channel 32, if the first switching setting 21 is set to an activated state, the media switching module 13 records the first playing scene 211 as the stored scene segment 23 according to the first switching setting 21. However, before the media switching module 13 is set to play the first media data 21, the first switching setting 21 might be set to be deactivated by a user through a relevant control interface. At this time, when setting the first media channel 31, regardless of the stored scene segment 23, the media switching module 13 directly plays the current scene of the first media data 21. Also, after the timepoint when the first switching setting 21 is set to be deactivated, the media switching module 13 no longer performs switching processing on the first media data 21. It may be decided, according to the processing mode of the system or by a user through a relevant control interface, whether to keep or delete the stored scene segment 23 stored previously.

(B) When performing switching processing on the first playing scene 211 according to the switching setting, the media switching module 13 records the playing timepoint of the first playing scene 211 (Step S136). Similarly, during the playing of the second media data 22, the media switching module 13 determines whether it is set to play the first media data 21 (Step S132). When being set to play the first media data 21, the media switching module 13 requires, through the channel connection module 11, the media supply module 20 to transmit the first scene segment 211 of the first media data 21 again from the playing timepoint (Step S138). When being not set to play the first media data 21, the media switching module 13 returns to Step S112 to confirm whether the first switching setting 41 corresponding to the first media data 21 is changed.

However, when the media switching module 13 is set to play the first media data 21, the media switching module 13 determines whether the second media data 21 is played to a scene end time, so as to decide whether to play the first media data 22 (Step S140).

Also, when being set to play the first media data 21 instead of the second media data 22, the media switching module 13 sets a return point corresponding to the current scene of the second media data 22 (Step S151). When being set to play the second media data 22 instead of the first media data 21, the media switching module 13 plays the second media data 22 from the return point (Step S152).

Either Step S140 or Steps S151 and S152 may be performed after Step S130 or Step S140 and Steps S151 and S152 are all performed after Step S130.

However, when determining that a second switching setting 42 corresponding to the second media data 22 is activated, the media switching module 13 analyzes whether a second playing scene 221 of the second media data 22 agrees with the scene demand data of the second switching setting 42, so as to decide whether to perform switching processing on the second playing scene 221 according to the second switching setting 42. The method is the same as the switching analysis on the first media data 21 by the media switching module 13, which is no longer described here.

Figure 8:
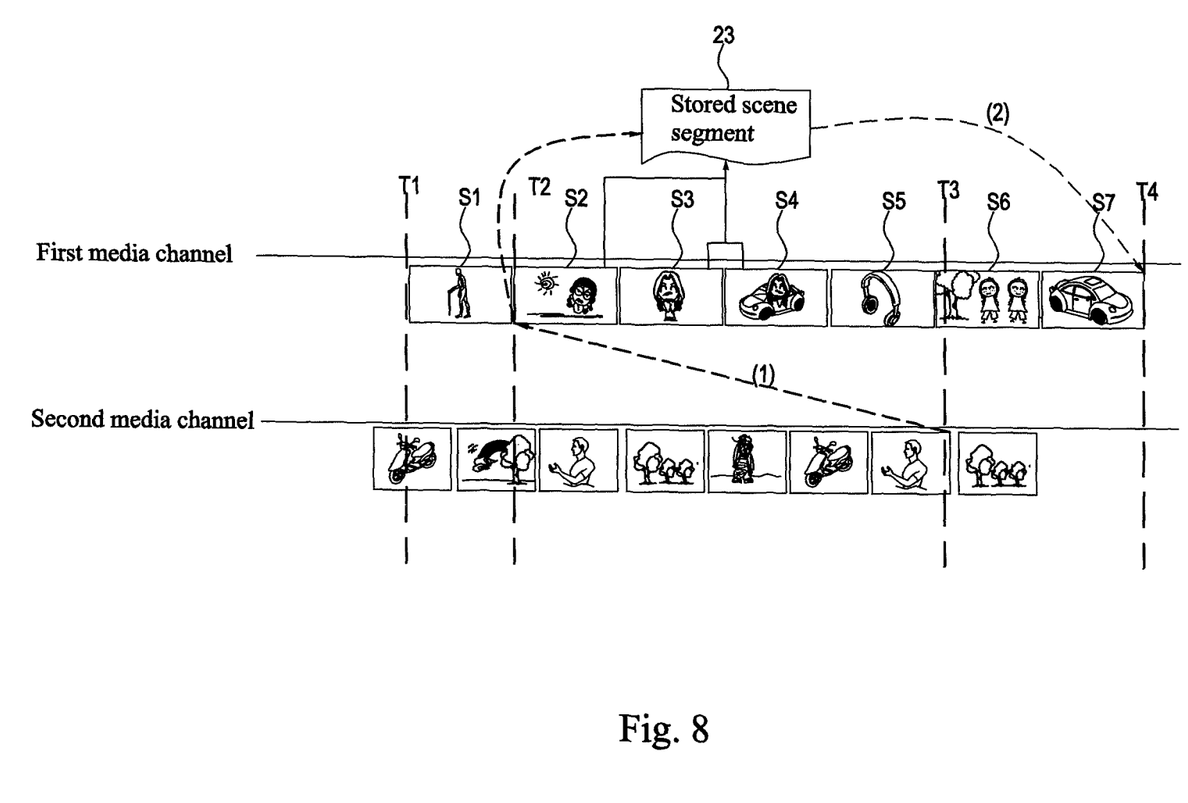
FIG. 8 is a schematic view of a first implementation of media switching according to an embodiment of the present invention.

FIG. 8 is a schematic view of a first implementation of media switching according to an embodiment of the present invention. Please refer to FIG. 8 in combination with the above drawings for ease of understanding. The first media data 21 includes playing scenes S1 to S7. It is assumed that the media switching module 13, during the playing of the second media data 22, namely, between a timepoint T1 and a timepoint T4, determines that the playing scene S2 agrees with the first switching setting 211 at a timepoint T2. Here, in the example that the media switching module 13 acquires first scene description data 212 or a playing time code corresponding to the first media data 21, the media switching module 13 may, at the timepoint T2, namely, when the scene S2 is being played, determine that the playing scene S2 agrees with the first switching setting 211, so as to perform switching processing on the playing scene S2. For example, for the stored scene segment 23, the timepoint T2 is recorded as the playing timepoint 24.

However, when the playing scene is a live picture type, that is, in the case that the media switching module 13 does not acquire the first scene description data 212 or playing time code corresponding to the first media data 21, the media switching module 13 can only determine that the playing scene S2 agrees with the first switching setting 211 through a currently notified image recognition approach or by acquiring the first scene description data 212 or playing time code after the playing scene S2 has been played or when the playing scene S2 is being played. Here, the media switching module 13 may start to store the playing content of the first media data 21 from the timepoint T2, so as to form a backup file, and then retrieve the playing scene S2 that agrees with the first switching setting 211 from the backup file to form cached media.

It is assumed that the media switching module 13 stores the playing scenes S2 to S4 to form a stored scene segment 23. When being switched to the first media channel 31 at the timepoint T3, the media switching module 13 automatically plays the stored scene segment 23 according to a preset value, or selectively plays the stored scene segment 23 according to the choice input by a user, or decides whether to play the stored scene segment 23 according to whether the first switching setting 211 is activated or not, and then plays the scene segment corresponding to the current time of the first media data 21. It is assumed that the timepoint when the stored scene segment 23 has been played is T4, the media switching module 13 then plays the playing scene after the timepoint T4 (the dotted line is the playing sequence).

Moreover, when the stored scene segment 23 is being played, the media switching module 23 also records the playing scenes of the first media data 21 from the timepoint T3. For example, the playing scenes S6 and S7 are stored to form another stored segment. When the stored scene segment 23 has been played, the media switching module 13 may automatically play the cached segment formed of the playing scenes S6 and S7 according to a preset value, or selectively play the cached segment formed of the playing scenes S6 and S7 according to the choice input by a user, or directly play the playing scenes after the timepoint T4.

Alternatively, the media switching module 13 records the timepoint T2 as the playing timepoint 24. When being switched to the first media channel 31 at the timepoint T3, the media switching module 13 requires the media supply module 20 to transmit the playing scene from the timepoint T2 again, that is, the playing scene S2. Moreover, the media switching module 13 may supply a playing time range starting from the timepoint T2, for example, the playing time range starting from the timepoint T2 and ending with the end time of the playing scene S4, so as to require the media supply module 20 to transmit the playing scenes S2 to S4 from the timepoint T2 again. Similarly, when the playing scenes S2 to S4 are being played, the media switching module 13 also records the timepoint T3. After the playing scenes S2 to S4 have been played, the media switching module 13 may automatically, according to a preset value or selectively, according to the choice input by a user, require the media supply module 20 to transmit playing scenes from the timepoint T3 again, or require the media supply module 20 to transmit the playing scene at the current timepoint.

Figure 9:
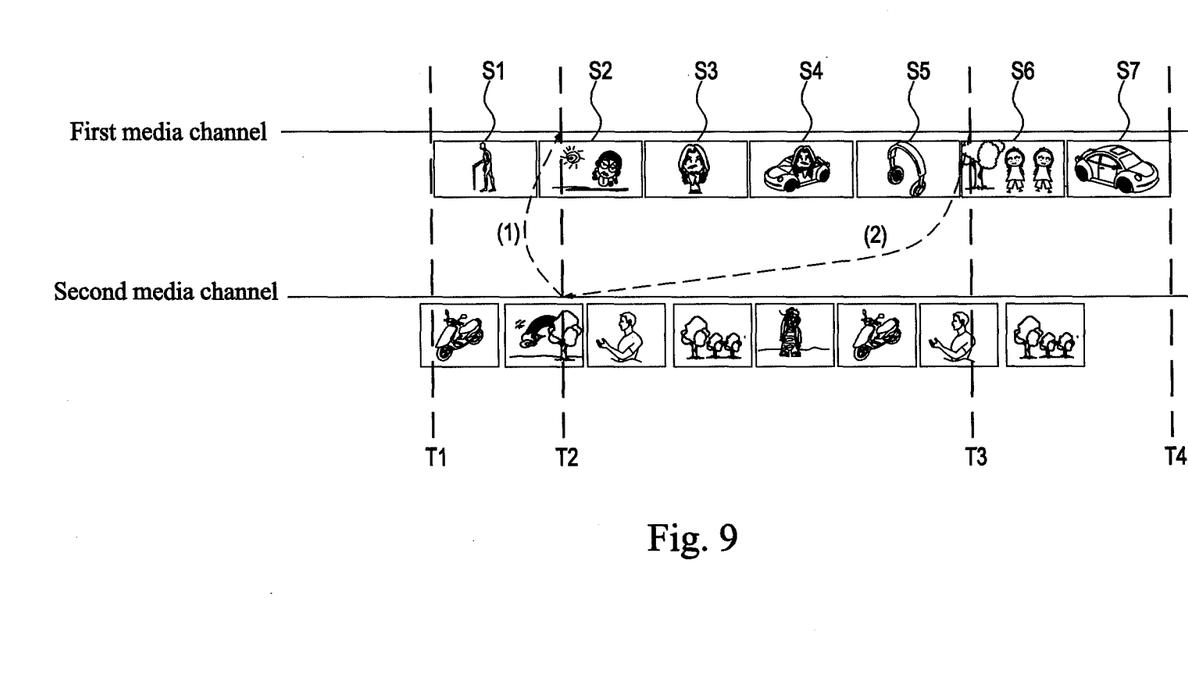
FIG. 9 is a schematic view of a second type of media switching according to an embodiment of the present invention.

FIG. 9 is a schematic view of a second type of media switching according to an embodiment of the present invention. Please refer to FIG. 9 and the above drawings for ease of understanding. It is assumed that the media switching module 13 is switched to the first media channel 31 at the timepoint T2 to play the first media data 21. The media switching module 13 records the timepoint T2 as the return point corresponding to the second media data 22. When being switched back to the second media channel 32 at the timepoint T3, the media switching module 13 starts to play the scene segment corresponding to the second media data 22 from the return point.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scene switching system applicable to a plurality of media channels, comprising:

a channel connection module, used for acquiring a first media data from a first media channel and acquiring a second media data from a second media channel; and a media switching module, used for, when determining that a first switching setting corresponding to the first media data is set to be activated, and the second media data is being played, analyzing whether a first playing scene of the first media data agrees with scene demand data of the first switching setting, so as to decide whether to perform switching processing on the first playing scene according to the first switching setting, wherein the switching processing comprises recording the first playing scene as a stored scene segment or sending out a prompt as a switching reference, wherein when the media switching module is set to play the first media data, the media switching module determines whether a current scene of the second media data has been played, so as to decide whether to play the first media data, and when acquiring a direct switching and playing instruction, the media switching module stops the determination of whether the current scene is ended, and directly plays the first media data transmitted by the first media channel.

2. The scene switching system applicable to a plurality of media channels according to claim 1, wherein when performing switching processing on the first playing scene according to the first switching setting and the media switching module records the first playing scene as a stored scene segment, and when being set to play the first media data, determines whether to play the stored scene segment.

3. The scene switching system applicable to a plurality of media channels according to claim 2, wherein when determining that the first switching setting is deactivated and being set to play the first media data, the media switching module plays a current scene of the first media data.

4. The scene switching system applicable to a plurality of media channels according to claim 2, wherein when determining that the first switching setting is activated and being set to play the first media data, the media switching module plays the stored scene segment.

5. The scene switching system applicable to a plurality of media channels according to claim 1, wherein the first media data is supplied by a media supply module, and when performing switching processing on the first playing scene according to the first switching setting, the media switching module records a playing timepoint of the first playing scene, and when being set to play the first media data, determines whether to require the media supply module to transmit the first playing scene of the first media data from the playing timepoint.

6. The scene switching system applicable to a plurality of media channels according to claim 5, wherein when determining that the first switching setting is deactivated and being set to play the first media data, the media switching module plays a current scene of the first media data.

7. The scene switching system applicable to a plurality of media channels according to claim 5, wherein when determining that the first switching setting is activated and being set to play the first media data, the media switching module requires, through the channel connection module, the media supply module to transmit a first scene segment of the first media data again from the playing timepoint.

8. The scene switching system applicable to a plurality of media channels according to claim 1, wherein the channel connection module further acquires scene description data corresponding to the first media data from the first media channel, the media switching module analyzes the scene description data to determine whether the first playing scene agrees with the scene demand data, so as to decide whether to perform switching processing on the first playing scene according to the first switching setting.

9. The scene switching system applicable to a plurality of media channels according to claim 1, wherein when deactivating the first switching setting, the media switching module stops performing switching processing on the first media data.

10. The scene switching system applicable to a plurality of media channels according to claim 9, further comprising a control module used for setting the first switching setting to be activated and deactivated, and setting a channel setting instruction, wherein when acquiring the channel setting instruction, the media switching module plays media data of a channel specified by the channel setting instruction.

11. The scene switching system applicable to a plurality of media channels according to claim 1, wherein when being set to play the first media data instead of the second media data, the media switching module analyzes whether a second playing scene of the second media data agrees with scene demand data of a second switching setting, so as to decide whether to perform switching processing on the second playing scene according to the second switching setting.

12. The scene switching system applicable to a plurality of media channels according to claim 1, wherein when being set to play the first media data instead of the second media data, the media switching module sets a return point corresponding to a current scene of the second media data, and when being set to play the second media data instead of the first media data again, the media switching module plays the second media data from the return point.

13. The scene switching system applicable to a plurality of media channels according to claim 1, wherein the prompt is a prompt picture or a text.

14. A scene switching method applicable to a plurality of media channels, comprising:
    acquiring first media data from a first media channel and acquiring second media data from a second media channel with a channel connection module;
    when determining that a switching setting corresponding to the first media data is set to be activated, and the second media data is being played, analyzing, by a media switching module, whether a first playing scene of the first media data agrees with scene demand data of the switching setting; and
    deciding, by the media switching module, according to an analysis result, whether to perform switching processing on the first playing scene according to the switching setting,
    wherein the switching processing comprises recording the first playing scene as a stored scene segment or sending out a prompt as a switching reference,
    wherein when the media switching module is set to play the first media data, the media switching module determines whether a current scene of the second media data has been played, so as to decide whether to play the first media data, and when acquiring a direct switching and playing instruction, the media switching module stops the determination of whether the current scene is ended, and directly plays the first media data transmitted by the first media channel.

15. The scene switching method applicable to a plurality of media channels according to claim 14, further comprising:
    when being set to play the first media data, playing, by the media switching module, the stored scene segment;
    when the media switching module is not set to play the first media data, determining, by the media switching module, whether the switching setting corresponding to the first media data is set to be activated; and
    when determining that the switching setting is deactivated, playing, by the media switching module, a current scene of the first media data.

16. The scene switching method applicable to a plurality of media channels according to claim 14, wherein the first media data is supplied by a media supply module, and the step of deciding, by the media switching module, whether to perform switching processing on the first playing scene according to the switching setting further comprises:
    when performing switching processing on the first playing scene according to the switching setting, recording, by the media switching module, a playing timepoint of the first playing scene.

17. The scene switching method applicable to a plurality of media channels according to claim 16, wherein, after the step of recording a playing timepoint of the first playing scene, the method further comprises:
    when being set to play the first media data, through the channel connection module, requiring, by the media switching module, the media supply module to transmit a first scene segment of the first media data again from the playing timepoint;
    when the media switching module is not set to play the first media data, determining, by the media switching module, whether the switching setting corresponding to the first media data is set to be activated; and
    when determining that the switching setting is deactivated, playing, by the media switching module, a current scene of the first media data.

18. The scene switching method applicable to a plurality of media channels according to claim 14, further comprising:
    when being set to play the first media data instead of the second media data, setting, by the media switching module, a return point corresponding to a current scene of the second media data; and
    when being set to play the second media data instead of the first media data again, playing, by the media switching module, the second media data from the return point.

19. The scene switching method applicable to a plurality of media channels according to claim 14, wherein the prompt is a prompt picture or a text.

20. A non-transitory recording medium, storing a program code readable by an electronic device, wherein when reading the program code, an electronic device executes a scene switching method applicable to a plurality of media channels, and the method comprises the following steps:
    acquiring first media data from a first media channel and acquiring second media data from a second media channel with a channel connection module;
    when determining that a switching setting corresponding to the first media data is set to be activated, and the second media data is being played, analyzing, by a media switching module, whether a first playing scene of the first media data agrees with scene demand data of the switching setting; and
    deciding, by the media switching module, according to an analysis result, whether to perform switching processing on the first playing scene according to the switching setting,
    wherein the switching processing comprises recording the first playing scene as a stored scene segment or sending out a prompt as a switching reference, wherein when the media switching module is set to play the first media data, the media switching module determines whether a current scene of the second media data has been played, so as to decide whether to play the first media data, and when acquiring a direct switching and playing instruction, the media switching module stops the determination of whether the current scene is ended, and directly plays the first media data transmitted by the first media channel.

* * * * *